(12) United States Patent
Lindsey (10) Patent No.: US 8,689,481 B2
(45) Date of Patent: *Apr. 8, 2014

(54) INTEGRATION OF SURFACE HEATING TO AN ENCLOSURE

(75) Inventor: Michael David Lindsey, Fort Collins, CO (US)

(73) Assignee: Pab Two, LLC, Wheeling, IL (US)

( * ) Notice: Subject to any disclaimer, the term of this patent is extended or adjusted under 35 U.S.C. 154(b) by 44 days.

This patent is subject to a terminal disclaimer.

(21) Appl. No.: 13/323,521

(22) Filed: Dec. 12, 2011

(65) Prior Publication Data

US 2013/0145681 A1 Jun. 13, 2013

(51) Int. Cl.
*A01M 1/20* (2006.01)

(52) U.S. Cl.
USPC .......................................... 43/132.1; 43/124

(58) Field of Classification Search
USPC ......... 43/107, 121, 123–125, 132.1, 140, 144
See application file for complete search history.

(56) References Cited

U.S. PATENT DOCUMENTS

| | | | |
|---|---|---|---|
| 4,063,068 A | 12/1977 | Johnson | |
| 4,916,290 A | 4/1990 | Hawkins | |
| 5,961,869 A | 10/1999 | Irgens | |
| 6,108,489 A | 8/2000 | Frohlich | |
| 6,142,974 A | 11/2000 | Kistner | |
| 6,262,394 B1 | 7/2001 | Shei | |
| 6,337,080 B1* | 1/2002 | Fryan et al. | 424/409 |
| RE40,290 E | 5/2008 | Shei | |
| 7,880,121 B2 | 2/2011 | Naylor | |
| 2003/0049025 A1* | 3/2003 | Neumann et al. | 392/390 |
| 2008/0115406 A1* | 5/2008 | Duston et al. | 43/131 |
| 2009/0145019 A1* | 6/2009 | Nolen et al. | 43/121 |
| 2009/0145020 A1* | 6/2009 | McKnight | 43/123 |
| 2009/0282728 A1* | 11/2009 | McKnight et al. | 43/109 |
| 2010/0329649 A1 | 12/2010 | Potter | |
| 2011/0012726 A1* | 1/2011 | Jessiman et al. | 340/501 |
| 2011/0113674 A1 | 5/2011 | Levy | |
| 2011/0196548 A1 | 8/2011 | Potter | |
| 2011/0289825 A1* | 12/2011 | James | 43/132.1 |
| 2011/0308139 A1 | 12/2011 | James | |
| 2011/0315672 A1* | 12/2011 | Benda et al. | 219/385 |
| 2012/0060407 A1 | 3/2012 | Lindsey | |

FOREIGN PATENT DOCUMENTS

| | | | |
|---|---|---|---|
| GB | 2077958 | * | 12/1981 |
| WO | WO2010/096184 | | 8/2010 |

OTHER PUBLICATIONS

PCT, Notification of Transmittal of the International Search Report and the Written Opinion of the International Searching Authority, or the Declaration, in International Application No. PCT/US2012/054165, dated Dec. 7, 2012. (14 pages).

Third-Party Submission Under 37 CFR 1.290 submitted in U.S. Appl. No. 13/232,156. (42 pages).

James, David, PackTite™ Assembly & Operating Instructions Manual, Sep. 2008, Nuvenco, Inc. (8 pages).

Bed Bug Proof of Sale Date document, Sep. 17, 2008, thebedbugresource.com. (5 pages).

http://www.bedbugsupply.com/PackTite-Portable-Bed-Bug-Heat-Treatment-Device_p_33.html; Oct. 19, 2010; 5 pages.

* cited by examiner

*Primary Examiner* — David Parsley
(74) *Attorney, Agent, or Firm* — McAndrews, Held & Malloy, Ltd.

(57) ABSTRACT

Disclosed are designs and methods for integrating heating film onto surfaces and enclosures that are useful for preventing the infestation of pests. Specifically, designs to increase the effective heating area and location of said heating film within enclosures such as suitcases. Also, the use of heating films to create a thermal barrier to prevent pests from crawling across a surface. Heating films can be utilized that are inexpensive, low-profile, and lightweight.

11 Claims, 10 Drawing Sheets

Shape Cut Outline 118
Bus Bar Cut Line 128
Registration Marks 134

FIG. 5

Side Heat Channel 132
Bus Bar Cut Line 128
Bus Bar A 120
Bus Bar B 126
Shape Cut Outline 118

INTEGRATION OF SURFACE HEATING TO AN ENCLOSURE

CROSS-REFERENCE TO RELATED APPLICATION

The present invention relates to killing bed bugs or other pests which may be located within a suitcase. This disclosure includes details which aid in the integration of heating elements into a piece of luggage to improve upon the functionality and manufacturability; and methods to manufacture heating film to suit various applications. Also disclosed is a system which may be used to establish an electrically heated, low-profile barrier to either contain or prevent infestation of an area.

The disclosure improves upon U.S. Patent Application 13/232,156, filed on Sep. 14, 2011, by Michael D. Lindsey, entitled "Heat Treatable Enclosure" and U.S. patent application Ser. No. 12/907,326, by David Levy, entitled "Inhibiting Pest Infestation".

BACKGROUND

As people travel there is a growing incidence of pest or insect infestation of garments transported in luggage and materials shipped in containers. For example, bed bugs may be found in many hotels, motels, homes, or other accommodations, even in highly sanitary conditions. During the day, nocturnal insects, such as bedbugs, disappear in crevices associated with suitcases, garments, clothes, pillows, towels, or the like. Even when these materials are examined, it is common for these insects, or the eggs of these insects, to go undetected and packed with garments and transported in luggage.

Lethal conditions for bed bugs are a combination of time and temperature. While it is generally agreed that temperatures over 120 F will kill bed bugs and eggs instantly, lower temperatures require an increased exposure time. For example, in a 2011 paper by Dr. Stephan Kells, entitled "*Temperature and Time Requirements for Controlling Bed Bugs under Commercial Heat Treatment Conditions*", cites that exposure to temperatures of 113 F may take an hour and a half to kill and adult and up to seven hours to destroy eggs.

The integration of surface heaters into a suitcase is discussed in prior art applications. This patent outlines manufacturing improvements and best practices for further integration.

SUMMARY OF THE INVENTION

The embodiment of the present invention comprises methods for integrating heating elements into luggage system for killing pests within which may reside in the interior or exterior of the luggage; the creation and manufacturing process to create these heating elements; and additional mechanical features which may aid in reducing the risk of pest contamination.

A significant challenge of heating an enclosure, such as a suitcase, lies in the fact that bed bugs, as well as other pests, are sensitive to heat and will move away from a heat source as the temperatures becomes lethal. Cool spots may be prevalent throughout the enclosure and provide a harborage for the pest during the heat treatment. For travel applications, such as suitcases, however, the uses of bulky insulation or convective passages are undesirable.

There are multiple requirements on the heating elements employed for this application. Heating elements must be strategically positioned to overcome the heat loss throughout the application. Heating elements should not impede the basic functionality of the luggage, ergo, they must be lightweight, consume a minimum volume within the enclosure, and resilient to the mechanical wear seen by luggage during transport. For safety and commercialization purposes, the overall system while the heating elements are active must be not exceed surface temperature standards enforced by UL, CSa, and CE.

Ideal candidates for this application are IR heating films which have been commonly used as under floor heating systems. Heating films consume a minimal amount of volume as the film thickness is roughly 0.25 mm. Heating films are moderately pliable and may be applied to any rigid surface, including surfaces which extend in multiple planes, to create a continuous heating surface. Heating films are mass produced via a screen printing process which deposits carbon-graphite elements between bus bars. This process allows for unique shapes and designs to be manufactured meeting the need of the application. Heating films are distributed worldwide and are recognized by various certification agencies. Advances in the heat film technology over the last two years include the use of positive temperature co-efficient materials in the carbon-graphite that can be employed to help to regulate temperatures.

Alternatively, heating elements may also be created using resistive heating elements such as ribbon wire or metal alloys such as NiChrome. These have been more traditionally accepted for use as heating pads, electric blankets, etc. These may have some advantages such as the ability to create unique designs, but the process to manufacturer is more costly.

DETAILED DESCRIPTION OF THE PREFERRED EMBODIMENTS

Figure 1:
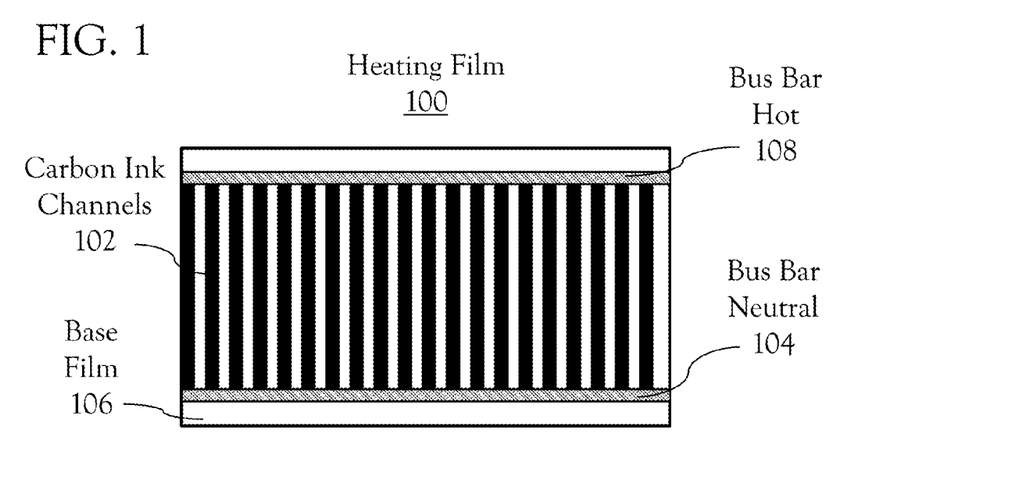
FIG. 1 is an illustration of heating film as it is currently produced.

FIG. 1 is a view of heating film 100 as it is commonly produced. The heating film 100 is comprised of a base film 106 which carbon ink channels 102 are deposited between two bus bars, specifically bus bar neutral 104 and bus bar hot 108. When a voltage differential is applied across the bus bar, the carbon ink produces heat via resistive heating and infrared radiation.

Figure 2:
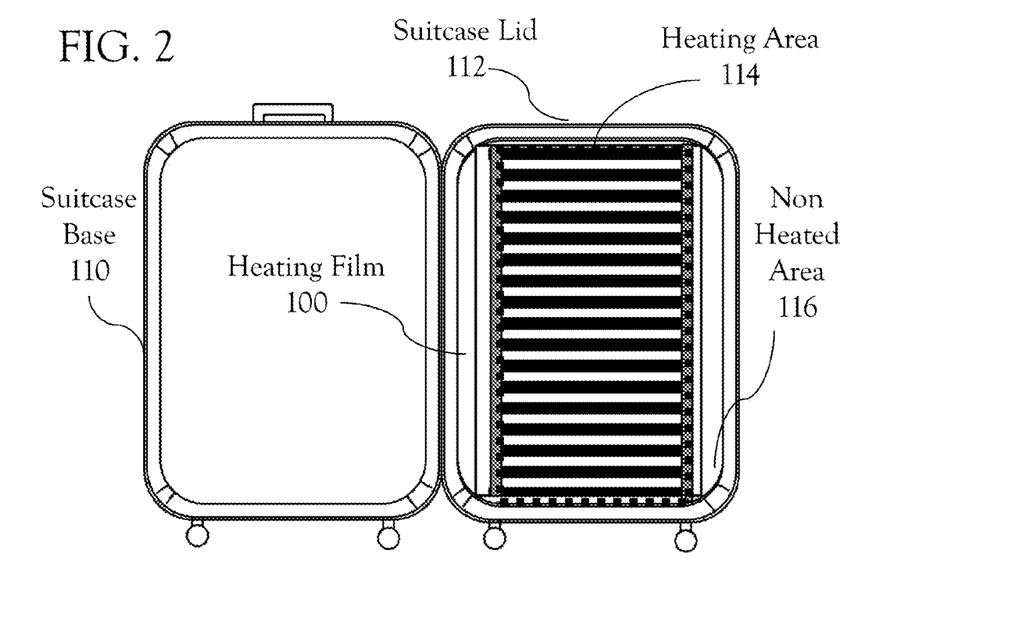
FIG. 2 is a view of standard film when placed within an open suitcase.

FIG. 2 is a view of the heating film 100 as commonly produced applied to an enclosure, in this case a suitcase lid 112. The heating film 100 could also be applied to the suitcase base 110 and walls to create a heated enclosure that is capable killing pests within the enclosure. A deficiency in this design is the non-heated areas 116 which are outside of the heating area 114 and may not reach temperature sufficient to kill pests if the suitcase is loaded with materials.

Figure 3:
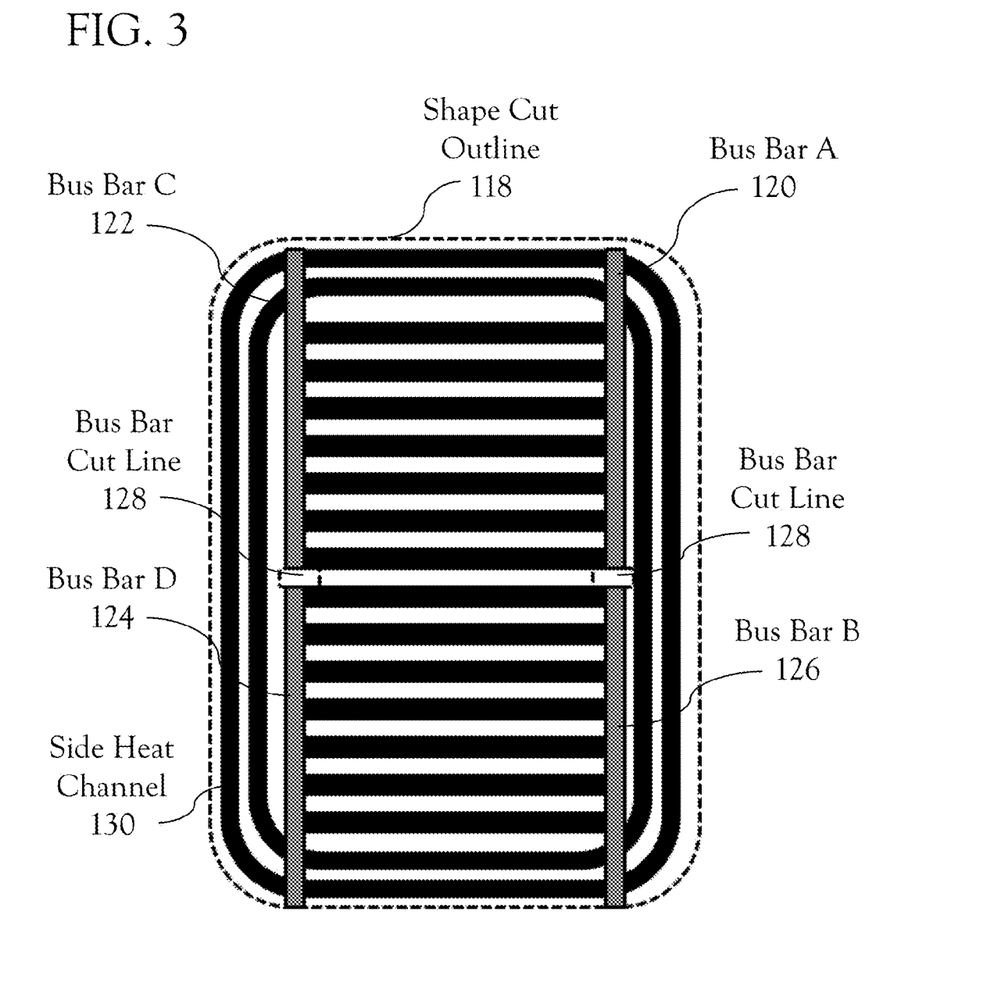
FIG. 3 is a view of a film where the booth bar has been separated to enable differential voltage across.

FIG. 3 is a view of an improved heating film design for eliminating non-heated area 116 for the enclosure application. The improved design incorporates side heat channels 130 which extend the heat area 114 outside of the bus bar. To create a differential across the side heat channel 130, the bus bar is severed at the bus bar cut line 128. This heating element becomes active when bus bar B 126 and bus bar C 122 are connected to neutral and bus bar A 120 and bus bar D 124 are connected to hot. Additionally, the perimeter of the heating film is cut to mechanically fit along the shape cut outline 118.

Figure 4:
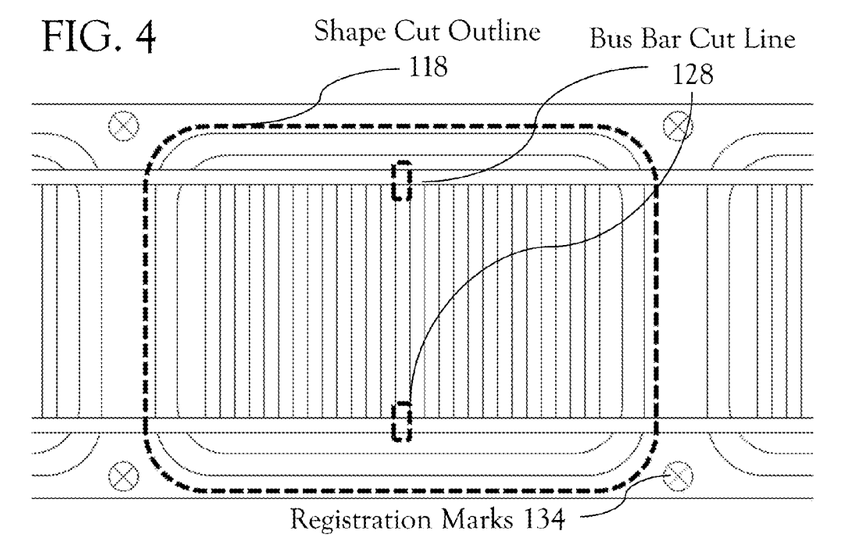
FIG. 4 is a top view of heating film which may be die cut to form an application specific shape.

FIG. 4 illustrates how a mechanical punch could be employed to produce the improved element in a manufacturing environment. Registration marks 134 printed during the creation of the film could be used to accurately align a die cutting tool. In a single operation the die cutter would cut out the shape cut outline 118 and bus bar cut line(s) 128.

Figure 5:
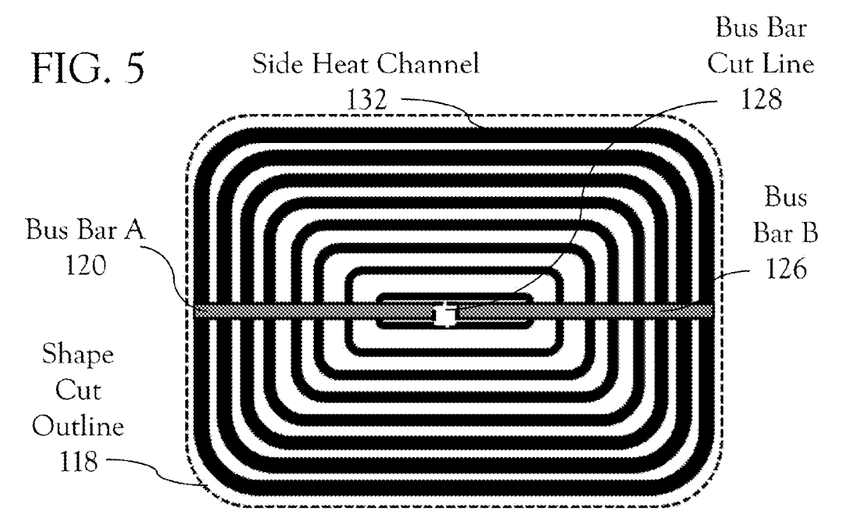
FIG. 5 is a view of a heating film created with a single booth bar.

FIG. 5 is another view of an improved heating film which uses a single bus bar. The bus bar cut line 128 separates the single bar into bus bar A 120 and bus bar B 126. The side heat channel 132 would be designed as shown to have lower carbon deposits on the inner side heat channel 132 and greater carbon deposits on the outer side heat channel 132 to create a uniform heating element.

Figure 6:
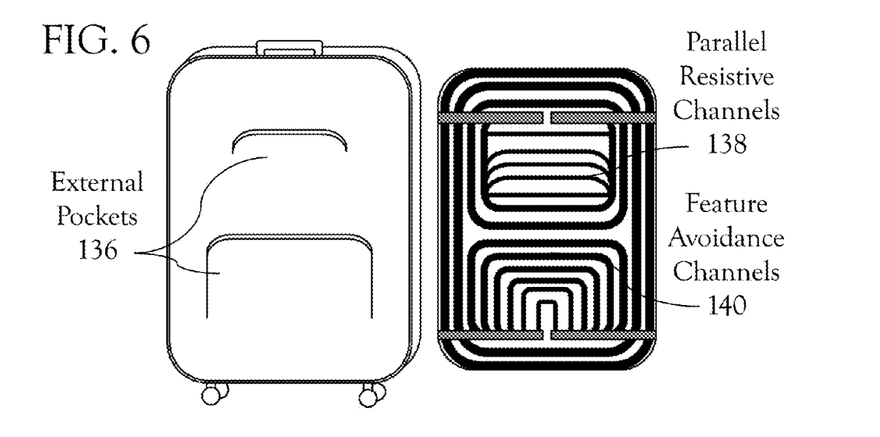
FIG. 6 is a view of luggage with external features and corresponding heating film.

FIG. 6 is a view of an improved heating film design to accommodate features such as external pockets 136 which may exist in the application. To be effective, the heating elements must cover the entire design while accommodating an opening. Parallel resistive channels 138 may be designed into the film or u-shaped feature avoidance channels 140 are examples of solutions which address this challenge.

Figure 7:
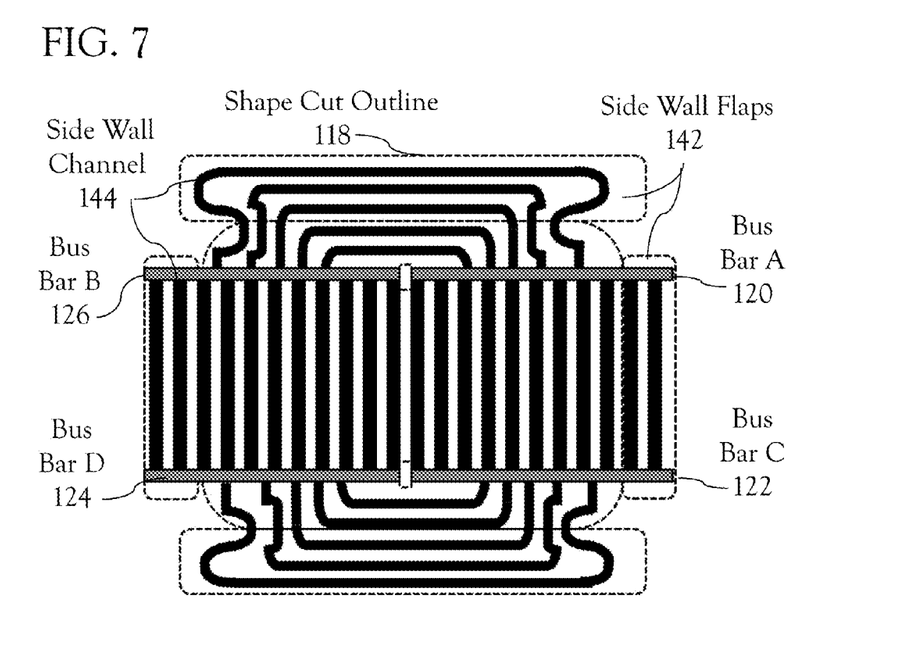
FIG. 7 is a view of a heating film which can form a three dimensional enclosure.

FIG. 7 is a view of a heating film design which may be used to create a three-dimensional object. The design includes side wall channels 144 which are printed on side all flaps. The side wall flaps 142 are installed into the application perpendicular to the base of the film.

Figure 8:
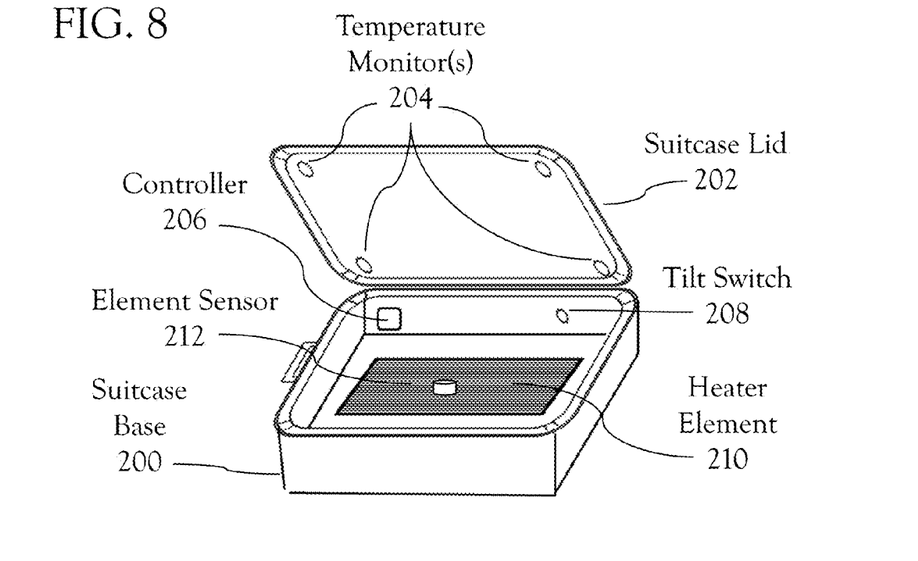
FIG. 8 is a view of luggage configured as a heating system.

FIG. 8 is view of a suitcase application where a single heating element is used. This approach is sufficient to eliminate pests within the suitcase when the suitcase is empty. A tilt sensor may be employed in the case where the optimum performance is dependent on the orientation of the enclosure. For this design, the heater element 210 is placed on base of the suitcase and on a wall opposite temperature monitors 204. The heater element 210 temperature may be regulated by using a sensor element 212 feeding back to a controller 206. The heater element 210 temperature may also be regulated by use of normally closed bi-metallic thermal switches. The heater element 210 may also be self-regulated using positive temperature coefficient materials within the element. Temperature monitors 204 may be monitored and report the lowest temperature to determine the end of a heating cycle or wired in series in the case of thermal switches.

Figure 9:
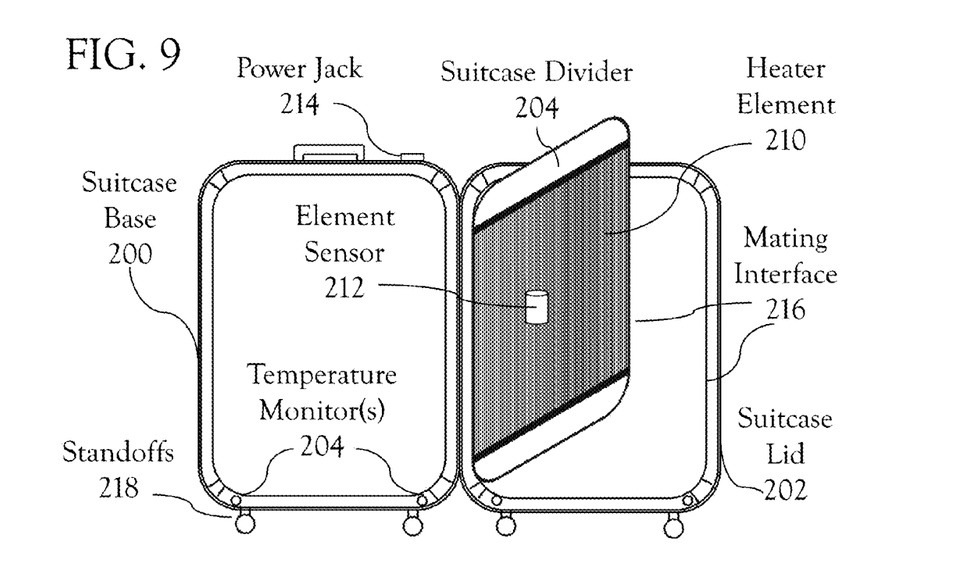
FIG. 9 is a view of an alternate configuration of luggage as a heating system

FIG. 9 is a view of the heating element 210 when it is designed into the suitcase divider 204. This design is an improvement to placing the element in the walls of the suitcase base 200 or suitcase lid 202 as it radiates equally to both sides of the container. The suitcase divider is common in the art of suitcase design to allow a user to close the suitcase lid 202. The suitcase divider is commonly held in place by mating interface 216 such as zippers or latches. This design also illustrates using the wheels as standoffs to allows the majority of the enclosure to be surrounded by an ambient environment. Temperatures monitors are placed in the lower corners of the enclosure.

Figure 10:
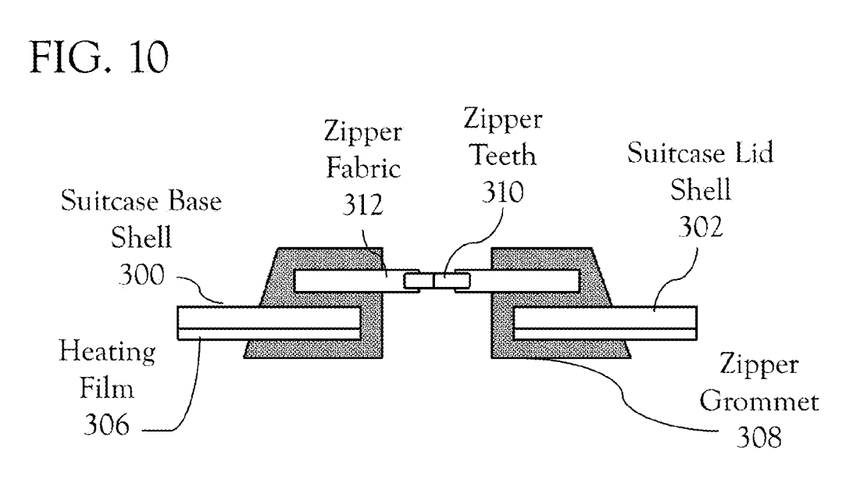
FIG. 10 is a view of the heating film and zipper interface.

FIG. 10 is a close up view of a zipper and grommet which may be used to hold a suitcase in the closed position. This design allows the heating film 306 to be placed as close as possible to the zipper teeth 310 and zipper fabric 312. Heat in these locations will cause most pests to move deeper into the enclosure rather than to attempt escape. The zipper grommet 308 is commonly used to secure the zipper fabric 312 to either the suitcase base shell 300 or the suitcase lid shell 302.

Figure 11:
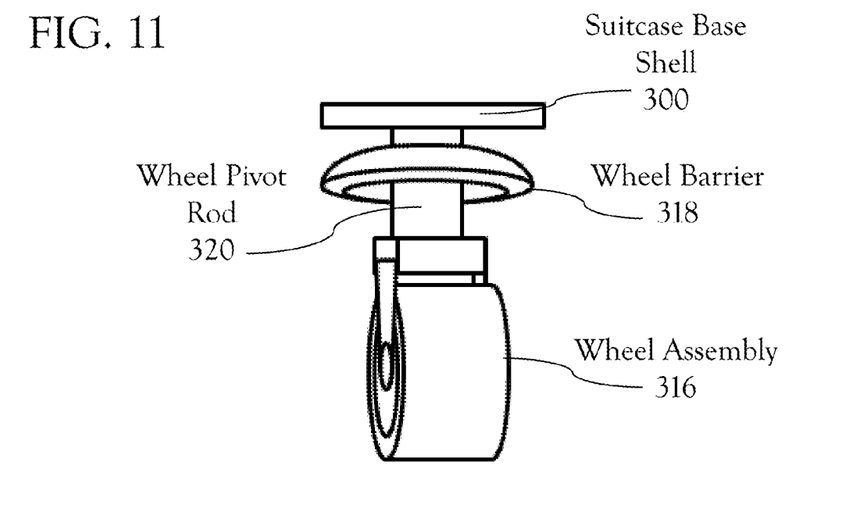
FIG. 11 is a view of mechanical barriers to protect wheels.

FIG. 11 is a view of a mechanical barrier which may be used to prevent pests from climbing up the wheel and taking harborage or from egressing from a heated suitcase to a cooler point. During heated operation, the suitcase base shell 300 is designed to reach a temperature that would cause the bug to egress from the outer surfaces. The escape instinct threshold for pests such as bed bugs is reported as 108 F. If the wheel barrier 318 is designed to be sufficiently smooth, the pest would unable to escape by crawling down the wheel pivot rod 320 and taking harborage on the wheel assembly 316. The wheel pivot rod may also be made from a material which would conduct heat further making harborage on the wheel assembly 316 undesirable. The convex shape of the wheel barrier 318 would prevent pests from crawling up the wheel assembly to take harborage on the suitcase when the elements are inactive.

Figure 12:
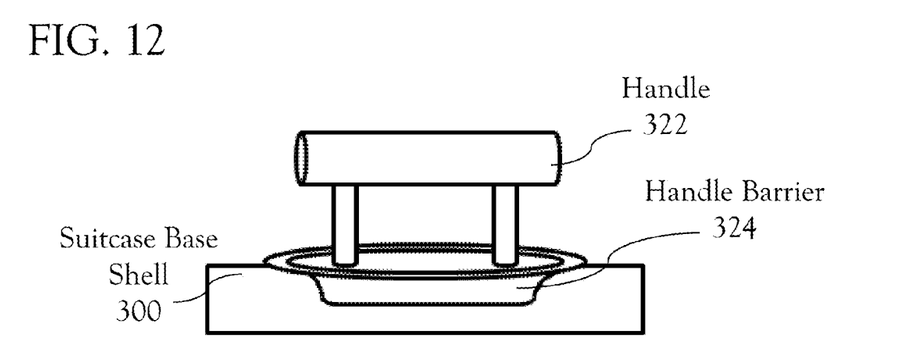
FIG. 12 is a view of mechanical barrier to protect handles.

FIG. 12 is a view of a mechanical barrier which may be used to prevent pests from aking harborage on the handle 322. The handle barrier may take a convex shape as shown or simply be made of materials that are sufficiently non-porous to prevent traction by the pests.

Figure 13:
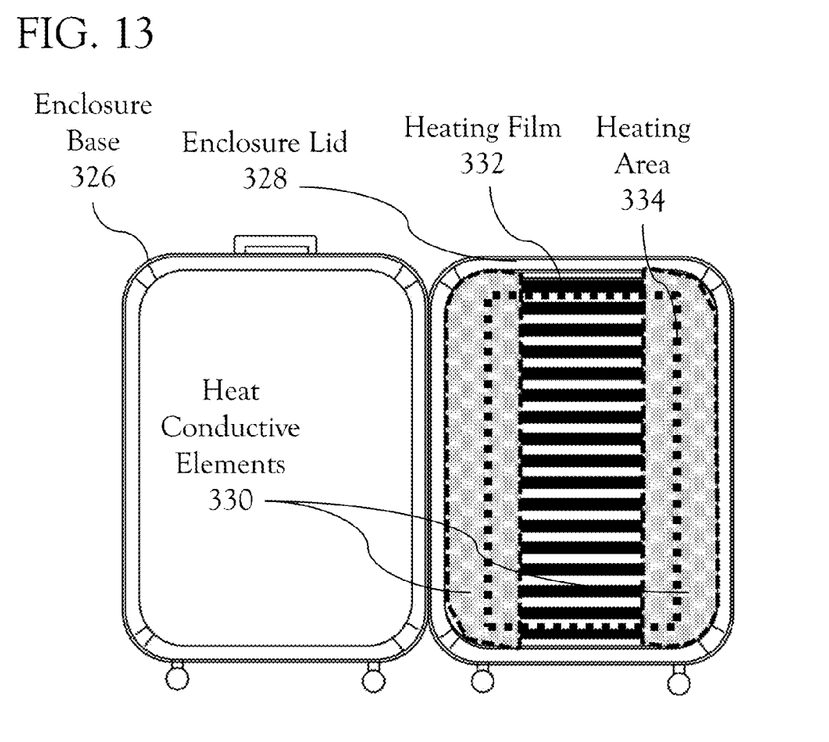
FIG. 13 is a view of an enclosure with heat conductive elements.

FIG. 13 is a view of an enclosure which comprises an enclosure base 326 and an enclosure lid 328. While the enclosure is shown as a suitcase, it is used here to demonstrate a method to employ heat conductive elements 330 to locally raise the temperature of cool spots previously identified as non-heated area 116. The heat conductive elements 330 are arranged such that they transfer heat from the heating area 334 which is created by active elements of the heating film 332. The heat conductive elements 330 can be coupled proximate or adjacent to the heating area 334. The heat conductive element 330 can comprise a number of materials with a high thermal conductivity such as any of a heavy aluminum, copper, or alloy metal foil, biaxially-oriented polyethylene terephthalate, or the like. The heat conductive elements 330 can have several functions including: increased uniform distribution of heat generated by the heating film 332 within the heating area 334, heat transfer from the heating area 334 to other areas within the inside space of the enclosure body, additional structural support for the heating film 332, electrical isolation of the heating film 332 and associated circuitry, and contact protection of the heating film 332.

Figure 14:
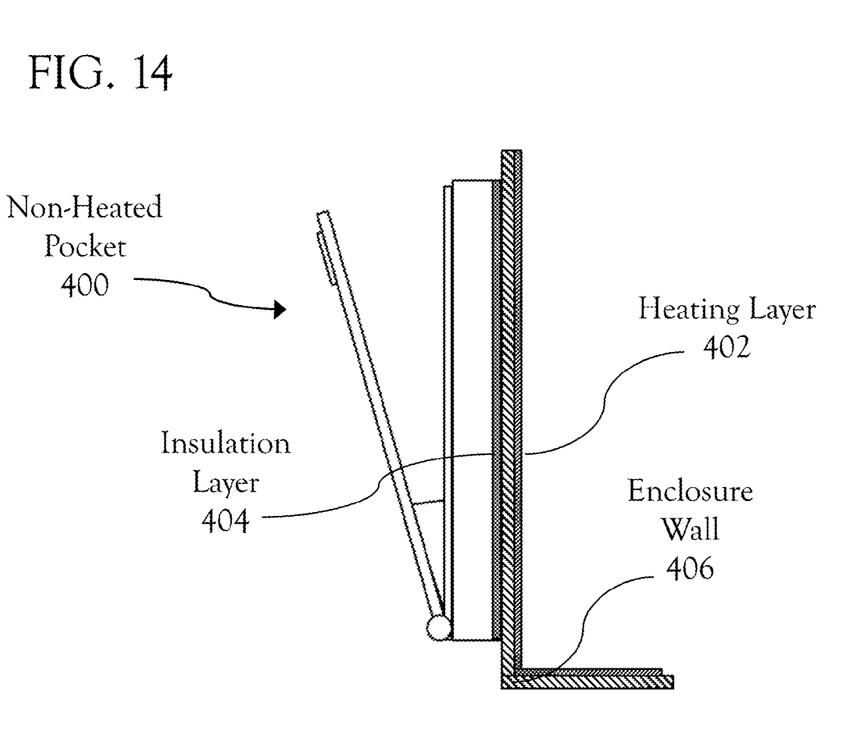
FIG. 14 is a view of an unheated pocket for heat sensitive items.

There are numerous items used during travel which may be sensitive to heat which may include medicines, deodorants, and such. FIG. 14 is a view of a non-heated pocket 400 which may be used to hold such materials during the heat treatment. The pocket may be on the enclosure wall 406 as shown or embedded in such that the outer flap is flush with the enclosure wall 406. An insulation layer 404 may be used to prevent heat from the heating layer 402 to permeate the contents of the non-heated pocket. Mechanical barriers may be used to prevent pests from easily accessing the pocket.

Figure 15:
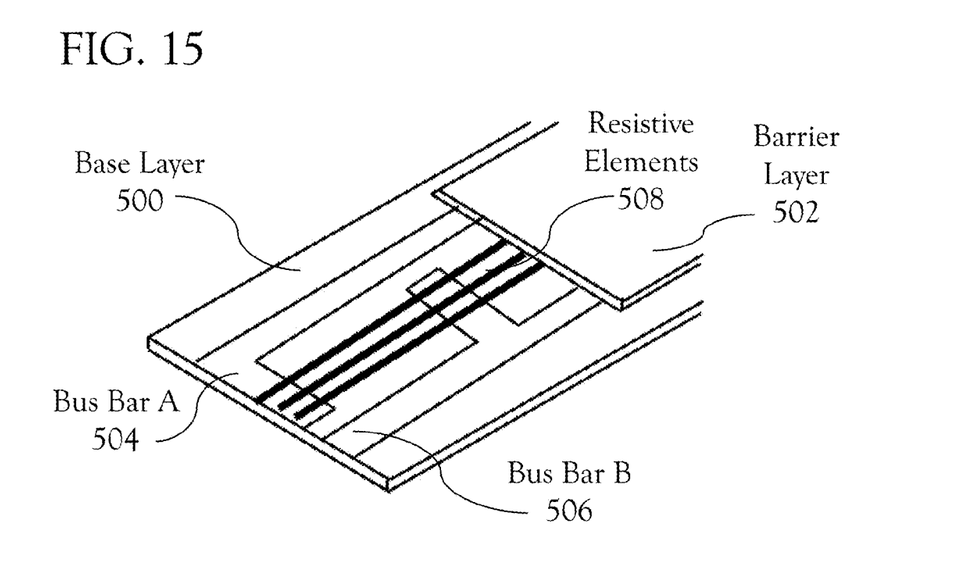
FIG. 15 is a view of an electrical thermal barrier using resistive wiring.
Figure 16:
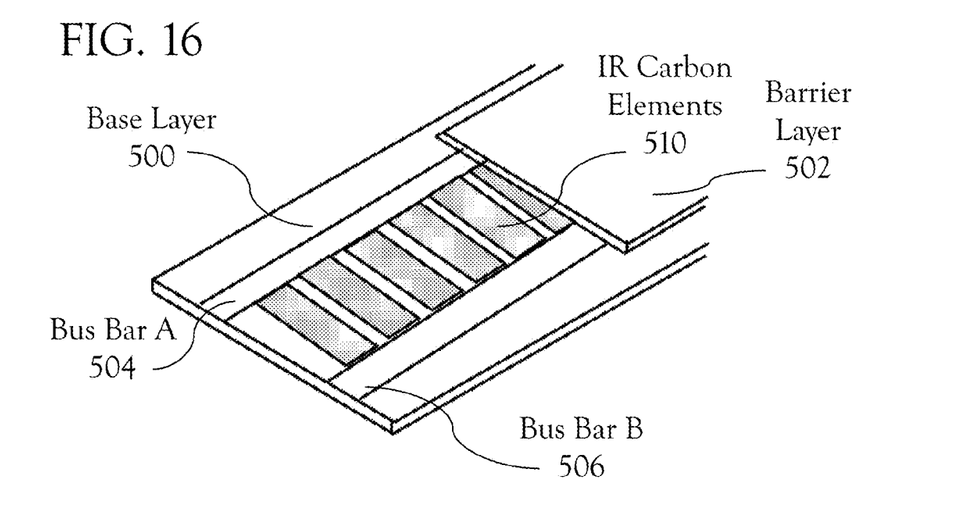
FIG. 16 is a view of an electrical thermal barrier using heating film.

FIG. 15 and FIG. 16 are the detailed design of a heating tape 520 which may provide an electrical heat based barrier which may prevent pests from traversing across the barrier. The barrier is designed to have an extremely low profile thus avoiding a trip hazard and allowing easy access for devices such as hospital gurneys or wheeled medical equipment. The surface temperature should be sufficiently high to deter pests from going across, but low enough not to cause burns or be a health risk to humans. Because the width of the barrier is significantly small, the voltage across bus bar A 504 and bus bar B 506 may be low voltage thus reducing electrical hazard. The barrier layer 502 is a heat conductive material that is held at temperatures of 120 to 178 degrees Fahrenheit. The barrier layer is designed to incorporate several functions including: thermal transfer from the resistive elements 508 or IR carbon elements 510, electrical isolation, and physical protection of the active elements. The width of the barrier layer 502 may vary depending on the environment and type of pest, but is designed such that a pest crawling across the surface would instantly be exterminated. The base layer 500 should have sufficient insulation such that it may be applied to cement or tile floors. As shown in FIG. 15, the heating elements may comprise resistive elements 508 such as NiChrome wire or similar alloy, carbon based. As shown in FIG. 16, the heating elements may comprise of IR carbon elements 510 such as those used in IR film. The IR carbon elements may be printed directly on the base layer 500 or barrier layer 502. An adhesive may be applied to the base layer for ease of installation. For an alternative embodiment, the adhesive may be applied to the top of the barrier layer to heat items. The resistive elements 508 or IR Carbon Elements 510 may be regulated through the use of positive temperature coefficient materials. The power sent through the resistive elements 508 may be adjusted in manufacturing by increasing or decreasing the gap between the teeth of bus bar A and bus bar B. Because the elements in this design are parallel circuits, the overall length of the tape may be sufficiently long without affecting performance.

Figure 17:
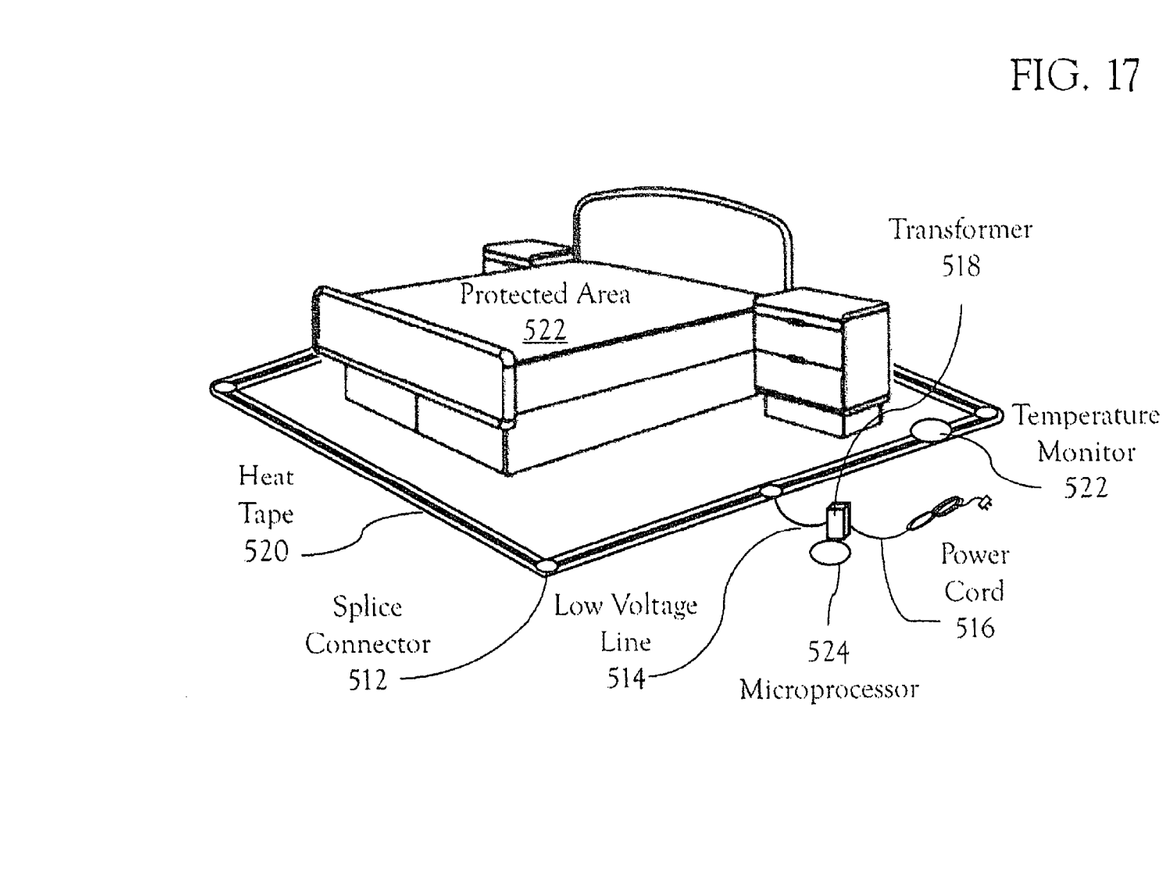
FIG. 17 is a view of an electrical thermal barrier around a bed.

FIG. 17 is an example of how the heating tape 520 may be applied to the floor to create a protected area 522. A splice connector 512 may be used at the corners to form angles or from the incoming power supply. The installation in FIG. 17 shows a power cord 516 and step down transformer 518 to reduce the voltage. The low voltage line 514 which provides power to the heat tape 520 may be either AC or DC. While this figure illustrates the use of the heat barrier on the floor, it can equally be employed around doorways, on walls, or any surface to create a thermal barrier.

A temperature monitor 522, such as a thermistor, may be used to locally read the temperature of the thermal barrier. Said temperature monitor may be coupled to a microprocessor 524 to provide a closed loop control of the heat tape 520. The microprocessor 524 would limit power to the heat tape through a TRIAC or other common electrical power control circuit. Alternatively, a mechanical rheostat or other power limiting device may be used to set temperatures during installation or ongoing by the user.

What is claimed is:

1. A system for eliminating pests in connection with heatable materials, the system comprising:
    an enclosure adapted to receive heatable materials, the enclosure having an exterior portion and an interior portion, the interior portion forming an interior compartment, the interior portion including walls having an interior surface defining the interior compartment; and
    an infrared heating film integrated into the enclosure, the infrared heating film comprising a bus bar and a plurality of side heat channels to provide a heating area extending beyond the bus bar;
    wherein the infrared heating film comprises an outer portion and an inner portion disposed radially inward of said outer portion, the heating film also comprising a first bus bar, a second bus bar, an outer side heat channel and an inner side heat channel,
    wherein the outer side heat channel connects the first bus bar to the second bus bar along a path in the outer portion of the heating film, and wherein the inner side heat channel connects the first bus bar to the second bus bar along a path in the inner portion of the heating film,
    wherein the outer side heat channel is larger than the inner side heat channel, and
    wherein the infrared heating film is operable to kill pests at all locations within the interior compartment.

2. The system of claim 1, wherein the side heat channels comprise carbon-graphite deposits.

3. The system of claim 2, wherein the heating element is integrated into at least one wall of the interior portion of the enclosure.

4. The system of claim 3, wherein the side heat channels are arranged to minimize the non-heated area in the at least one wall of the interior compartment.

5. The system of claim 4, wherein the interior portion of the enclosure comprises six walls, and the heating element is integrated into all six walls of the interior portion.

6. The system of claim 1, wherein the enclosure comprises a first exterior pocket on the exterior portion of the enclosure, and wherein the infrared heating film is adapted to kill pests within the first exterior pocket.

7. The system of claim 6, wherein the enclosure comprises further comprises a second exterior pocket on the exterior portion of the enclosure, and wherein the second exterior pocket is not heated by the infrared heating film.

8. The system of claim 7, wherein the second exterior pocket comprises an insulation layer used to reduce heat from an infrared heating film from penetrating the second exterior pocket.

9. The system of claim 1, wherein the enclosure is a suitcase.

10. The system of claim 9, wherein the suitcase comprises at least one suitcase divider, and wherein the infrared heating element is located within the suitcase divider.

11. The system of claim 10, further comprising a tilt sensor to determine orientation of the enclosure.

* * * * *